(12) United States Patent
Acquavella et al.

(10) Patent No.: US 9,973,744 B2
(45) Date of Patent: *May 15, 2018

(54) 3D TRACKED POINT VISUALIZATION USING COLOR AND PERSPECTIVE SIZE

(71) Applicant: Adobe Systems Incorporated, San Jose, CA (US)

(72) Inventors: James Acquavella, Seattle, WA (US); David Simons, Seattle, WA (US); Daniel M. Wilk, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/886,578

(22) Filed: Oct. 19, 2015

(65) Prior Publication Data
US 2016/0044299 A1  Feb. 11, 2016

Related U.S. Application Data

(63) Continuation of application No. 13/532,544, filed on Jun. 25, 2012, now Pat. No. 9,208,577.

(51) Int. Cl.
*H04N 13/02* (2006.01)
*G06T 7/00* (2017.01)
(Continued)

(52) U.S. Cl.
CPC ......... *H04N 13/0257* (2013.01); *G06T 7/248* (2017.01); *G06T 7/579* (2017.01);
(Continued)

(58) Field of Classification Search
CPC .......... G06T 19/20; G06T 2207/30244; G06T 2219/2012; G06T 2219/2016;
(Continued)

(56) References Cited

U.S. PATENT DOCUMENTS 7,194,110 B2   3/2007  Qian
7,343,278 B2   3/2008  Billinghurst et al.
(Continued)

OTHER PUBLICATIONS

Maltaanon, After Effects CS6—3D Camera Tracking, Apr. 11, 2012, https://www.youtube.com/watch?v=SiwuCS5Bobk.*
(Continued)

*Primary Examiner* — Francis Geroleo
(74) *Attorney, Agent, or Firm* — Kilpatrick Townsend & Stockton LLP

(57) ABSTRACT

One exemplary embodiment involves receiving a plurality of three-dimensional (3D) track points for a plurality of frames of a video, wherein the 3D track points are extracted from a plurality of two-dimensional source points. The embodiment further involves rendering the 3D track points across a plurality of frames of the video on a two-dimensional (2D) display. Additionally, the embodiment involves coloring each of the 3D track points wherein the color of each 3D track point visually distinguishes the 3D track point from a plurality of surrounding 3D track points, and wherein the color of each 3D track point is consistent across the frames of the video. The embodiment also involves sizing each of the 3D track points based on a distance between a camera that captured the video and a location of the 2D source points referenced by the respective one of the 3D track points.

20 Claims, 12 Drawing Sheets

(51) Int. Cl.
 *G06T 7/20* (2017.01)
 *G06T 19/20* (2011.01)
 *G11B 27/031* (2006.01)
 *G06T 7/579* (2017.01)
 *G06T 7/246* (2017.01)

(52) U.S. Cl.
 CPC ............ *G06T 19/20* (2013.01); *G11B 27/031* (2013.01); *G06T 2207/30244* (2013.01); *G06T 2219/2012* (2013.01); *G06T 2219/2016* (2013.01)

(58) Field of Classification Search
 CPC ..... G06T 7/0071; G06T 7/204; G11B 27/031; H04N 13/0257
 USPC .......................................................... 348/46
 See application file for complete search history.

(56) References Cited

U.S. PATENT DOCUMENTS

| | | | |
|---|---|---|---|
| 8,811,660 | B2 | 8/2014 | Qureshi et al. |
| 8,963,921 | B1* | 2/2015 | Cote ....................... G06T 19/20 345/426 |
| 2010/0150401 | A1 | 6/2010 | Kizuki et al. |
| 2010/0172542 | A1 | 7/2010 | Stein et al. |
| 2011/0135159 | A1 | 6/2011 | Uchida |
| 2013/0187905 | A1* | 7/2013 | Vaddadi ................ G06T 15/205 345/419 |
| 2013/0335417 | A1* | 12/2013 | McQueston ........... A61B 6/145 345/424 |

OTHER PUBLICATIONS

Van den Hengel et al., VideoTrace: Rapid interactive scene modelling from video, ACM Transactions on Graphics, Vo. 26, No. 3, Article 86, Jul. 2007.*

Fenix Motion Graphics, Tutorial—getting started with Syntheyes, Nov. 30, 2011, https://www.youtube.com/watch?v=q7nm_dJ-pek.*

Vfxword, SynthEyes Intense—knowledge for camera tracking, Sep. 7, 2010, https://www.youtube.com/watch?v=dipTbUkAXZk.*

Gabriel, Object Tracking Using Color interest, IEEE Conference on Advanced Video and Signal Based Surveillance, 2005, AVSS 2005, pp. 159-164.

Notice of Allowance from Related U.S. Appl. No. 13/532,544 dated Aug. 5, 2015, 11 pages.

* cited by examiner

3D TRACKED POINT VISUALIZATION USING COLOR AND PERSPECTIVE SIZE

CROSS-REFERENCE TO RELATED APPLICATIONS

This application is a continuation application of U.S. patent application Ser. No. 13/532,544 filed on Jun. 25, 2012, the contents of which is incorporated herein by reference in its entirety.

FIELD

This disclosure relates generally to computer software and more particularly relates to the creation, modification, use, and distribution of electronic content.

BACKGROUND

Video editing and other systems that employ three-dimensional ("3D") tracking systems have been used to track elements in video compositions. Such systems have tracked those items as they change position within the composition's frames over the course of one or more time segments or even over the entire course of the composition. For example, individual points (e.g., multiple points on a flat surface, ball, person, or any other object displayed in a composition) can each be tracked and marked in one or more frames of the composition. As a more specific example, a point may have been identified (automatically or manually) as a corner of a table surface in a first frame and in one or more subsequent frames of the composition. The video editing or other system employing 3D tracking displays individual frames of the composition with track points to indicate the location of the point in each of those multiple frames in which the point was computed. However, compositors and other users have often found the presentation of such track point markings to be visually confusing. For example, track points have been denoted with a color scheme that indicates the state of the tracker, such as, whether the tracker is new, accurate, or not accurate. The color scheme might indicate that the tracker has recently been computed, that the tracker has been verified to be accurate, or that the tracker has not been verified to be accurate. Additionally, some three-dimensional tracking systems render a visual trail (e.g. also showing, in one frame, the location of a track point in one or more prior frames) to indicate an origination point and/or a movement path for each of the track points in prior frames. The color schemes, trails, tracking point display characteristics, and other aspects of tracking systems have generally resulted in visually confusing displays making identifying and leveraging track points challenging for compositors and/or users.

SUMMARY

One exemplary embodiment involves receiving three-dimensional track points for the frames of a video, wherein the three-dimensional track points are extracted from two-dimensional source points identified in the video. The embodiment further involves rendering the three-dimensional track points across the frames of the video where each three-dimensional track point is represented by a hollow character, such as an 'x' and/or any other character. Additionally, the embodiment may involve coloring the three-dimensional track points with a color scheme to increase the temporal coherence of each of the three-dimensional track points. The embodiment may also involve sizing the three-dimensional track points based on a distance between a camera capturing the video and a location of the two-dimensional source point associated with a respective one of the three-dimensional track points.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Methods and systems are disclosed for rendering three-dimensional (3D) track points that are determined from two-dimensional (2D) source points and rendered on a two-dimensional (2D) display. In certain exemplary embodiments, a "track camera" operation analyzes a video composition to identify 2D source points and solves for the 3D track points. The determined 3D track points are rendered on the 2D display in a color scheme that enhances the temporal coherence of each of the 3D track points such that the 3D track points are clearly visible throughout the video composition. For example, each of the 3D track points may be represented by a distinguishable character, such as an "x," and may be colored randomly with a unique and distinguishable color such that each 3D track points can be easily identified. Additionally, the characters representing each of the 3D track points may be sized based on a distance between the location of the respective 3D track point and the camera capturing the video composition. For example, the 3D track points located closer to the camera may be represented by a larger character than the characters representing the 3D track points located farther away from the camera. Further, the 3D track points remain visible on the screen for as long as their corresponding 2D source points are visible. Therefore, the color scheme and the sizing of the 3D track points allows for users to quickly identify the 3D track points, improves the user experience, and allows for users to evaluate the accuracy of the camera operation.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
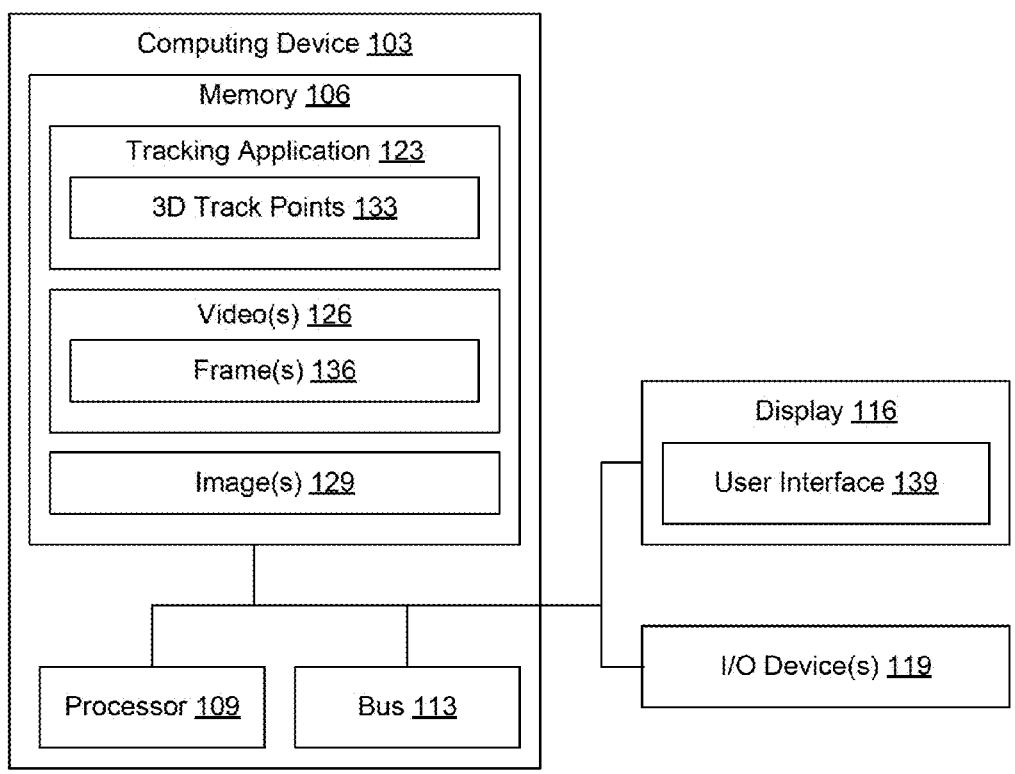
FIG. 1 is a block diagram depicting an exemplary computing device in an exemplary computing environment for implementing certain embodiments.

FIG. 1 is a block diagram depicting an exemplary computing device in an exemplary computing environment for implementing certain embodiments. The methods and systems disclosed herein are also applicable on other computing systems and environments. The environment shown in FIG. 1 includes a computing device 103 having a memory 106, a processor 109, a bus 113, a display 116, and a plurality of input/output devices 119.

As used herein, the term "device" refers to any computing or other electronic equipment that executes instructions and includes any type of processor-based equipment that operates an operating system or otherwise executes instructions. A device will typically include a processor 109 that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tables, laptop computers, Internet appliances, other processor-based devices, and television viewing devices. The exemplary computing device 103 may be used as special purpose computing devices to provide specific functionality offered by applications and modules.

As used herein, the term "application" refers to any program instructions or other functional components that execute on a device. An application may reside in the memory 106 of a device that executes the application. As is known to one of skill in the art, such applications may be resident in any suitable computer-readable medium and execute on an suitable processor. For example, as shown the device 103 has a computer-readable medium such as the memory 106 coupled to the processor 109 that executes computer-executable program instructions and/or accesses stored information. Such a processor 109 may include a microprocessor, an ASIC, a state machine, or other processor, and can be of any number of computer processors. Such processors include, or may be in communication with, a computer-readable medium which stores instructions that, when executed by the processor, cause the processor to perform the steps described herein.

As used herein, the term "file" refers to one or more electronic files that are maintained and organized by a file system. In one embodiment, files organized by the file system may be abstractions that do not directly correspond to any particular physical storage arrangements such as disk drives, portable storage media, etc. Each file may include a file name, a unique identifier, and a data object reference, and/or other data. In one embodiment, the file name may correspond to a human-readable character string that identifies the contents of the file and the unique identifier may correspond to a character string that uniquely identifies the file across the file system. Additionally, the data object reference may identify a data object associated with the file that is stored in the memory 106.

As used herein, the term "video" refers to a video composition stored as one or more electronic files that are maintained and organized by the file system. Each video composition may include a number of frames that form the video, as is known in the art. The video composition may be in digital format encoded in a variety of encoding standards, such as, for example, MPEG, QuickTime, RealMedia, Windows Media, MP4, Divx, Xvid, FlashVideo, and/or any other encoding standard.

The memory 106 represents a computer-readable medium that may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In one embodiment, the memory 106 includes a tracking application 123, one or more videos 126, one or more images 129, and/or any other type of data. The tracking application 123 represents an application for generating one or more (3D) track points 133 for a video 126. A 3D track point 133 may be a point in an image that the tracking application 123 tracks and/or follows through multiple frames 136 of the video 126 and then renders in 3D space. In one embodiment, the tracking application 123 extracts the 3D track points 133 by solving for them from one or more 2D source points. The 2D source points may be determined by identifying regions of high contrast in the image representing a frame 136 of the video 126. The regions of high contrast may be then tracked and/or followed through multiple frames 136 to generate the 2D source points. The 3D track points 133 for the frames of the video 126 are then extracted by solving for static 3D scene data and a corresponding camera view on each frame based on the 2D source locations using a standard mathematical approach as known in the art. For example, the 3D scene data may be represented by the camera location, an orientation of the camera when capturing the video 126, and the viewing angle over the span of the video 126. The 3D track points 133 may then be extracted by correlating the 3D scene data with the 2D source locations using an approach known in the art. In another embodiment, the tracking application 123 may receive the 3D track points 133 from another application stored in the memory 106, as can be appreciated.

The tracking application 123 may extract the 3D track points 133 by employing one or more alternative techniques. In one embodiment, the tracking application 123 may apply a 3D reconstruction technique to identify 3D structures in the frames of the video 126. The tracking application 123 may first track features (i.e. points) within a frame of the video 126 throughout the course of the video 126. Then, the tracking application 123 may employ the 3D reconstruction technique to estimate a camera motion from the set of points and estimate intrinsic camera parameters (for example, focal length) for the frames of the video 126. Once the camera motion and camera intrinsic parameters are estimated for the frames, 3D coordinates of the tracked points may be triangulated using the estimated motion parameters and camera intrinsic parameters. In some embodiments, the camera motion may have both translation components and rotation components.

The 3D reconstruction technique may be of at least three different varieties: a general 3D reconstruction technique, a rotation-based reconstruction technique, and a plane-based reconstruction technique. In an exemplary general 3D reconstruction technique, frames of the video 126 are reconstructed where the camera motion includes a non-zero translation component. A non-zero translation component indicates that the camera capturing the video 126 has moved when capturing the frames of the video 126. The 3D reconstruction technique receives a video 126 comprising a sequence of frames and estimates the rotation and translation components of the camera motion, as well as the camera intrinsic parameters if not known. The general 3D reconstruction technique may start by reconstructing an initial subset of keyframes that span only a portion of the video 126 and then incrementally reconstructing additional keyframes to cover the span of the video 126. For instance, the general 3D reconstruction technique involves generating point trajectories over time in the frames of the video 126. Generating point trajectories first involves identifying features and tracking the location of that feature throughout the frames of the video 126. In one embodiment, this feature tracking may be implemented by the Lucas-Kanade-Tomasi approach. The Lucas-Kanade-Tomasi approach identifies good features that can be tracked throughout the course of a video 126 by identifying windows that include a sufficient amount of texture to track features and mapping changes in the texture between the windows in an affine map to associate velocities with their respective points. The initial keyframes are then reconstructed according to the generated point trajectories.

The remaining frames may then be reconstructed incrementally based on the reconstructed keyframes. For example, in the calibrated case where the camera intrinsic parameters are known, a 3-point based Random Sample Consensus (RANSAC) algorithm can be used to compute initial rotation and translation of a keyframe, which is then refined through a nonlinear optimization technique. New points are then added by identifying a closest frame to the first keyframe and determining all of the points that overlap both the first keyframe and the closest keyframe. The 3D coordinates for each of the overlapping points are then triangulated using motion parameters of the first keyframe and the motion parameters of the closest keyframe. In the uncalibrated case where the camera intrinsic parameters are not known, a 6-point based RANSAC algorithm may be used to compute the initial rotation and translation of a keyframe, which is then refined through a nonlinear optimization technique. New points are then added by identifying the closest frame and computing the 3D coordinates via triangulation, as discussed above. The general 3D reconstruction technique then calls for the optimization of the points where bad points such as points too close to the camera and/or points that resulting in incomplete triangulation are removed.

Additionally, a rotation-based reconstruction technique involves reconstructing from frames of the video 126 where the camera motion includes a zero and/or a near zero translation component (i.e., the camera capturing the video 126 has not moved). In an exemplary rotation-based reconstruction technique, only the rotation components of the camera motion are estimated, as well as the camera intrinsic parameters. In one embodiment, the rotation-based reconstruction technique involves an incremental approach to generating the reconstruction from the frames of the video 126. Alternatively or additionally, the rotation-based reconstruction may involve a divide-and-conquer approach where the frames of the video 126 are divided into sequences of frames and the resulting output for each sequence is merged to produce the final result.

The exemplary rotation-based reconstruction technique begins by determining point trajectories as described above for points within the frames of the video 126. Then, an initial set of keyframes of the video 126 are determined for reconstruction according to the point trajectories. The selected keyframes may be of a certain quality threshold such that the keyframes have a sufficient number of well-distributed points and have a sufficiently large relative rotation. For example, a quality score may be computed for an initial pair of keyframes based on a residual number of points in the keyframes that can be used for reconstruction. Upon selecting a pair of keyframes that satisfy the quality threshold, the rotation-based technique calls for reconstruction. To this end, a 2-point based RANSAC algorithm may be used to compute the initial relative rotation between the selected keyframes for the calibrated case (i.e., the camera intrinsic parameters are known) and then refined via a nonlinear optimization technique. Additionally, a 2-point RANSAC algorithm with a constant focal length or a 3-point RANSAC algorithm with a varying focal length may be used to compute the initial relative rotation between the selected keyframes for the uncalibrated case and then refined via a nonlinear optimization technique. Similarly, non-keyframes may then be reconstructed to cover the span of the video 126. Upon reconstruction of the frames of the video 126, the 3D structures may then be computed, as described above.

A plane-based reconstruction technique may also be used. For example, a plane-based reconstruction technique may be employed when the frames of the video 126 includes a dominant plane. In this technique, a set of point trajectories for the frames of the video 126 may be determined and a 2D plane may be detected from the trajectories. Next, a set of trajectories that follow the 2D plane are identified and used to compute a set of inter-frame homographies. For instance, any two images (i.e. frames) of the same planar surface are related by a homography. The homographies may then then be used to generated estimates for 3D camera motion, camera intrinsic parameters, and plane normals.

The 3D reconstruction technique may include a selection component where one of the reconstruction techniques described above is selected based on the characteristics of the frames of the video 126. For instance, the selection component of the 3D reconstruction technique may involve selecting from the general 3D reconstruction technique, the rotation-based reconstruction technique, and a plane-based reconstruction technique. In one embodiment, if the frames have a zero or a near-zero translational component, then the rotation-based reconstruction technique is selected. Additionally, if the frames have a dominant plane, then the plane-based reconstruction technique is selected. Otherwise, the general 3D reconstruction technique is selected.

In one embodiment, the estimated camera motion parameters and the camera intrinsic parameters may be used for determining a depth of the 3D track point 133 in the video 126. For example, the position of the camera may be triangulated based on at least one or more of the camera motion parameters, the camera intrinsic parameters, and the computed 3D track points 133. Then, a distance between a 3D track point 133 and the camera position may be computed to determine the depth of the respective 3D track point 133.

Additional examples of techniques for identifying the 3D structures of the frames, for example by identifying camera motion, and identifying the depth of track points in video compositions are described in U.S. Patent Application No. 61/621,365 entitled "Structure from Motion Methods and Apparatus," filed on Apr. 6, 2012, which is incorporated herein by this reference in its entirety.

The tracking application 123 then renders the 3D track points 133 for a frame 136 on a 2D display that is depicting the respective frame 136, as will be described with respect to FIGS. 2-4. In one embodiment, each 3D track point 133 may be represented by a hollow character "x" and/or any other character or marking. Additionally, each 3D track point 133 may be colored randomly such that the 3D track points 133 are visually distinguishable from one or more of the surrounding 3D track points 133. Further, the color scheme for coloring the 3D track points 133 may be selected to enhance the temporal coherence of each of the 3D track points 133. In one embodiment, the color scheme allows a user to follow and easily identify a 3D track point across multiple frames of the video 126. For instance, the color scheme may make a 3D track point more recognizable and conspicuous for a user to track and follow the 3D track point through the course of the video 126. The tracking application 123 may select a color scheme such that each 3D track point 133 in a group of 3D track points 133 has a unique and distinguishable color where each of the 3D track points 133 within the group are within a predetermined distance from each other. Additionally, the tracking application 123 may size the 3D track points 133 rendered on the 2D display based on a distance between the respective 3D track point 133 and the camera capturing the video 126. For example, 3D track points 133 associated with 2D source points located closer to the camera may appear larger than 3D track points 133 associated with 2D source points located farther away from the camera. In one embodiment, the distance between the 3D track point 133 and the camera may be determined from the stationary 3D track point 133 and the position of the camera. For example, the camera intrinsic parameters determined during computation of the 3D track points 133 may be used for determining the distance.

The tracking application 123 may render the 3D track points 133 across multiple frames 136 of the video 126. For example, the 3D track points 133 may appear on the 2D display whenever the 2D source point associated with the 3D track point 133 is visible in the video 126. In one embodiment, objects within the video 126 may occlude certain 2D source points at various times throughout the video 126. For example, the camera capturing the video 126 may be a moving camera that causes a 2D source point to be hidden by an object in the video 126 because of the angle of the camera. In this instance, the 3D track point 133 associated with the hidden 2D source point may not be rendered on the 2D display while the corresponding 2D source point remains hidden.

Having rendered the 3D track points 133, the tracking application 123 then facilitates for the insertion of 3D objects into the video 126, as will be described with respect to FIGS. 5-9. In one embodiment, the tracking application 123 determines a plane identified by at least three of the 3D track points 133 and renders a target that identifies the plane. As an example, the target may appear as a number of concentric circles that identify the location and orientation of the plane. Alternatively, the target may appear as any other shape that has a finite boundary and that identifies the location and orientation of the plane. The orientation of the plane may be based on the location of the 3D track points 133 that define the plane. For instance, the plane may appear to be angled and/or tilted up or down to certain degrees based on the location of the 3D track points 133. 3D objects may be inserted into the video 126 at the target, as will be described. For example, 3D objects include text layers, solid layers, null layers, shadow catchers, and/or any other type of 3D object.

Figure 2:
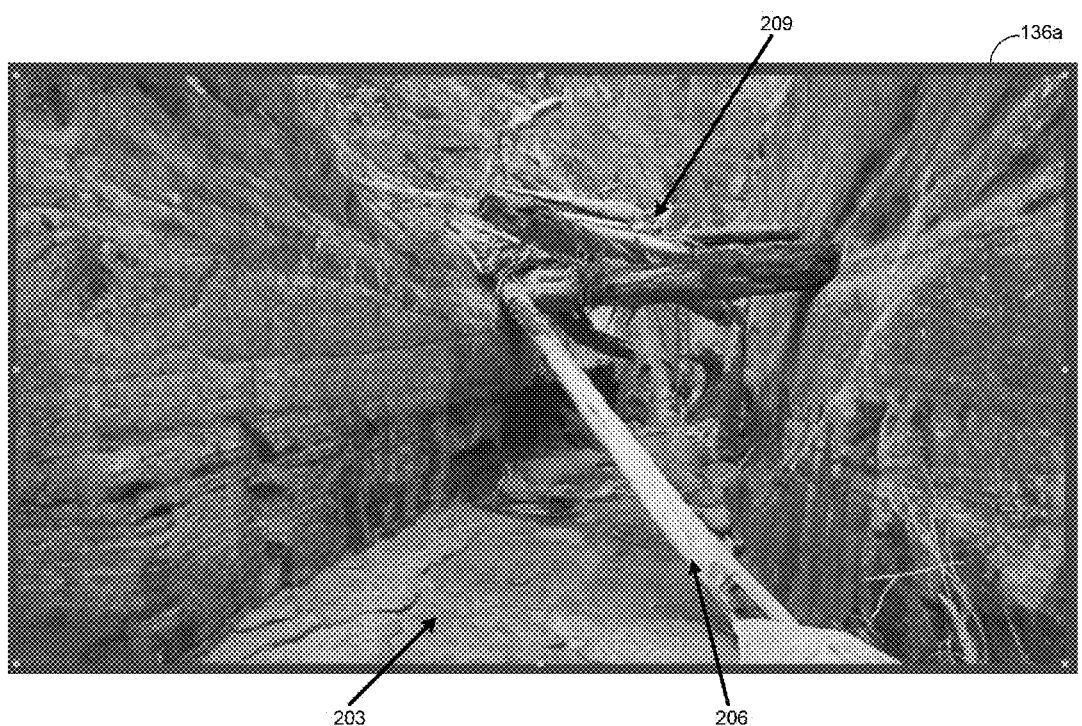
FIGS. 2-4 illustrate exemplary user interfaces rendered on a display depicting three-dimensional track points.

FIG. 2 shows one example of a user interface 139 according to certain embodiments of the present disclosure that is rendered on the display 116. In this example, the user interface 139 depicts a frame 136, indicated herein as start frame 136*a*, of a video 126 (FIG. 1). For instance, the start frame 136*a* shown in this figure represents the first frame 136 of the video 126. As shown, start frame 136*a* includes a hiking trail 203 with a fallen tree trunk 206 obstructing the path. Additionally a second tree trunk 209 is overhanging a distance down the hiking trail 203. A person viewing FIG. 2 can appreciate that certain objects shown in the start frame 136*a* appear to be closer to the camera than other objects within the start frame 136*a*.

In one embodiment, a user may request that the 3D track points 133 (FIG. 1) be rendered in the start frame 136*a*. For example, the user may transmit the request by selecting a "track camera" option from a menu option, issuing a "track camera" command from a command line, and/or any other method. The tracking application 123 (FIG. 1) receives this request and processes each frame 136 of the video 126 to extract the 3D track points 133, as described above. In one embodiment, the tracking application 123 may execute in the background allowing the user to perform other functions while the tracking application 123 extracts the 3D track points 133.

Figure 3:
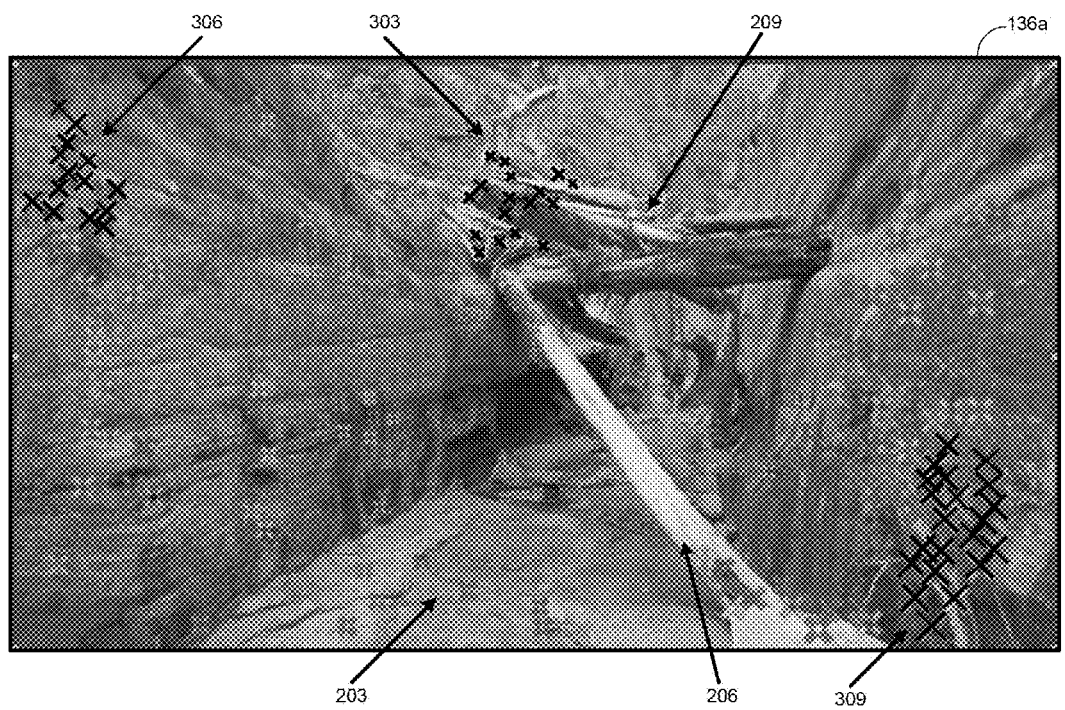

Next, FIG. 3 shows one example of a user interface 139 according to certain embodiments of the present disclosure that is rendered on the display 116. In this example, the user interface 139 depicts the start frame 136*a* of a video 126 (FIG. 1) with 3D track points 133 (FIG. 1) rendered in the start frame 136*a*. As shown, the 3D track points 133 are rendered across the frame, where each one of the 3D track points 133 are associated with a unique 2D source location (not pictured). In this example, the 3D track points 133 are each denoted with a hollow "x" character. However, in other embodiments, other characters may be used, as can be appreciated. For discussion purposes, three groupings of 3D track points 133 are emphasized: a first grouping 303, a second grouping 306, and a third grouping 309. Additionally, the hiking trail 203, the fallen tree trunk 206, and the second tree trunk 209 remain visible after the tracking application 123 has extracted the 3D track points 133.

As discussed above, the tracking application 123 (FIG. 1) applies a color scheme to all of the 3D track points 133 such that each of the 3D track points 133 is visually distinguishable from the surrounding 3D track points 133. For instance, 3D track points 133 located within a certain distance of each other may each be colored with a unique and distinguishable color. In another embodiment, adjacent 3D track points 133 may be of a similar color. However, color differences between the adjacent 3D track points 133 and any neighboring 3D track points 133 may help distinguish the 3D track points 133 from each other. Thus, the temporal coherence of the 3D track points 133 is increased by applying such a color scheme. For example, the 3D track points 133 included in each of the groupings may each have a unique and distinguishable color to increase the temporal coherence of each 3D track point 133 within the grouping.

The first grouping 303, appearing on the upper portion and near the center of the frame 136 includes a group of 3D track points 133 that are smaller in size relative to the 3D track points 133 in the second grouping 306 and the third grouping 309. For example, the x's (emphasized for clarity) representing the 3D track points 133 in the first grouping 303 are relatively small compared to the other emphasized 3D track points 133. As discussed above, 3D track points 133 located farther away from the camera appear smaller in size than 3D track points 133 located closer to the camera. Therefore, the 3D track points 133 of the first grouping 303 are located farther away from the camera compared to the 3D track points 133 of the other two groupings.

The second grouping 306, appearing on the upper left hand portion of the frame 136 includes a group of 3D track points 133 that are larger than the 3D track points 133 of the first grouping 303 but smaller than the 3D track points of the third grouping 309. For example, the x's (emphasized for clarity) representing the 3D track points 133 in the second grouping 306 are larger than the x's representing the 3D track points 133 in the first grouping 303 but smaller than the x's representing the 3D track points 133 in third grouping 309. This indicates that the 3D track points 133 of the second grouping 306 are closer to the camera than the 3D track points 133 of the first grouping 303 but not as close to the camera as the 3D track points 133 of the third grouping 309.

The third grouping, appearing on the bottom right hand portion of the frame 136 includes a group of 3D track points 133 that are larger in size compared to the 3D track points 133 of the first grouping 303 and the second grouping 306. For example, the x's (emphasized for clarity) representing the 3D track points 133 in the third grouping 309 are relatively large compared to the other emphasized 3D track points 133. As discussed above, 3D track points 133 located closer to the camera appear larger in size than 3D track points 133 located farther away from the camera. Therefore, the 3D track points 133 of the third grouping 309 are located closest to the camera compared to the 3D track points 133 of the other two groupings. In one embodiment, the sizes of all of the 3D track points 133 may be altered while still maintaining relativity in sizes of 3D track points 133 with respect to each other. For example, a "track point size" configuration may be altered to zoom in on the 3D track points 133, as can be appreciated.

Figure 4:
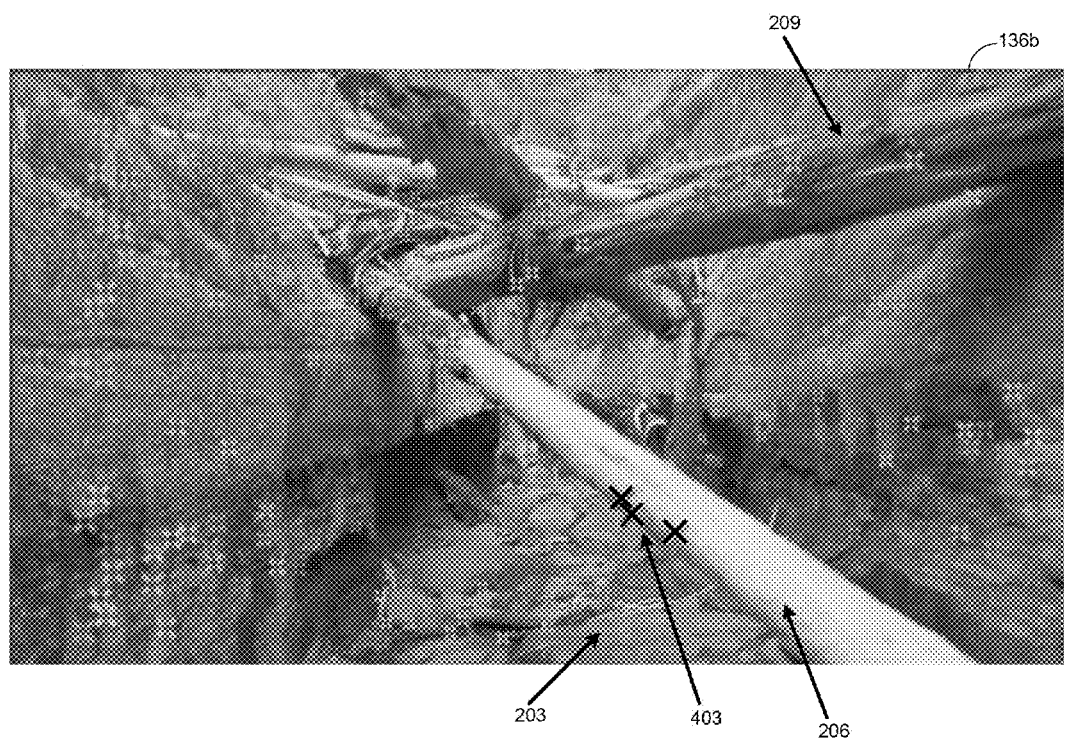

FIG. 4 shows one example of a user interface 139 according to certain embodiments of the present disclosure that is rendered on the display 116. In this example, the user interface 139 depicts another frame 136, denoted herein as subsequent frame 136b, of the video 126 (FIG. 1) with 3D track points 133 (FIG. 1) rendered in the subsequent frame 136b. Also shown in FIG. 4 are the hiking trail 203, the fallen tree trunk 206, the second tree trunk 209, and a new grouping 403. In this example, the camera capturing the subsequent frame 136b has advanced down the hiking trail 203. Accordingly, the angle and location of the camera are altered and thus the perspective for the viewer is altered.

In one embodiment, all of the extracted 3D track points 133 remain visible across multiple frames 136 of the video 126 during playback. However, a number of the 3D track points 133 may be hidden by objects shown in the video 126. For instance, the fallen tree trunk 206 may block a portion of the 3D track points 133 that may be visible in the start frame 136a (FIG. 1) but not visible in the subsequent frame 136b. Similarly, a number of the 3D track points 133 may appear in the subsequent frame 136b that may not have been previously visible in the start frame 136a. For example, the 3D track points 133 emphasized in the new grouping 403 were not previously visible in the start frame 136a. The 3D track points 133 of the new grouping 403 may not have been previously visible due to the camera angle associated with the start frame 136a.

Figure 5:
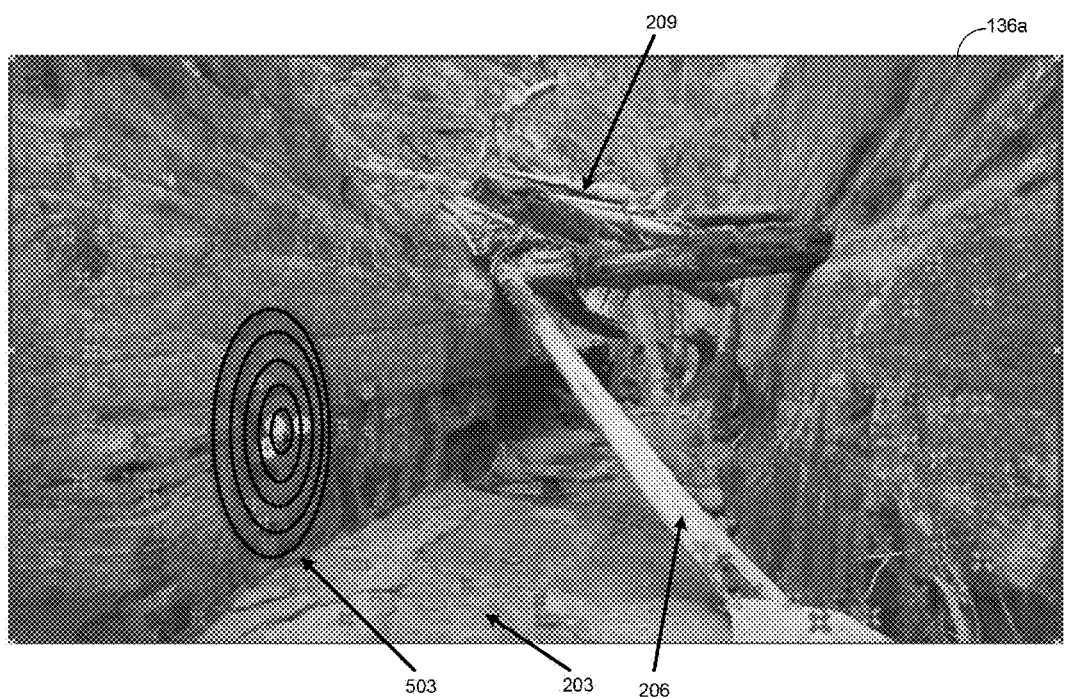
FIGS. 5-9 illustrate exemplary user interfaces rendered on a display depicting a three-dimensional target marker for insertion of three-dimensional objects.

FIG. 5 shows one example of a user interface 139 according to certain embodiments of the present disclosure that is rendered on the display 116. In this example, the user interface 139 depicts the start frame 136a of the video (FIG. 1). Shown are the hiking trail 203, the fallen tree trunk 206, and the second tree trunk 209. Additionally, a target 503 is depicted on a wall of the hiking trail 203.

In one embodiment, a user may wish to insert a 3D object into the video 126. To this end, the user may select a number of the 3D track points 133 (FIG. 1) to define a plane onto which the 3D object may be inserted. A minimum of three 3D track points 133 is necessary to define a plane, as can be appreciated. In one embodiment, the user may hover over an area of the start frame 136a using a mouse and/or another input device 119 (FIG. 1). In response, the tracking application 123 may automatically select three 3D track points 133 that are closest to the mouse. In one embodiment, the tracking application 123 may select the closest 3D track points 133 that form a polygon encompassing the mouse. For instance, a 3D track point 133 that is close to the mouse but does not form a polygon with the other two selected 3D track points 133 that encompasses the mouse may not be automatically selected by the tracking application 123. Additionally, the tracking application 123 may cause the selected 3D track points 133 to be highlighted, change color, and/or be visually stimulated in another manner to indicate their selection. In this example, the mouse hovers over an portion of the wall of the hiking trail 203, and in response, the tracking application 123 is shown as having selected three 3D track points 133 closest to the mouse. In another embodiment, the user may select 3D track points 133 for defining the plane. For instance, the user may select 3D track points 133 by, tracing around, clicking on, and/or otherwise manipulating the desired 3D track points 133. More than three 3D track points 133 may be selected, as can be appreciated.

The tracking application 123 then determines the plane defined by the selected 3D track points 133. Using the example of three 3D track points 133 being automatically selected, the tracking application 123 determines a plane defined by all three of the 3D track points 133. The tracking application 123 may then render a target graphic that identifies the determined plane. For example, a target graphic may include a number of concentric circles radiating outward from the center of the target graphic, shown as a target 503 in FIG. 5. In one embodiment, the target 503 may be oriented at an angle and/or exhibit a tilt based the location of the selected 3D track points 133 within the start frame 136a. The angle and tilt of the 3D object to be inserted into the space identified by the target 503 may be substantially similar to the angle and tilt of the target 503. Additionally, the target 503 may be resized such that the target 503 covers a larger and/or smaller area. For instance, the user may enlarge and/or shrink the depicted target 503, as can be appreciated. The size of the 3D object to be inserted into the space identified by the target 503 may be substantially similar to the size of the target 503.

In one embodiment, the target 503 is configured to be moveable within the start frame 136a. For example, the user may move the target 503 up, down, left, and/or right within the defined plane of the start frame 136a using the mouse, cursors on a keyboard, and/or another input device 119. In response, the tracking application 123 may slide the target 503 up, down, left, and/or right within the defined plane of the target 503 while maintaining the orientation, angle, and tilt of the target 503. Thus, the user may shift the plane of target 503, thereby shifting the space within the plane where the 3D object may be inserted into the video 126. In another embodiment, the user may shift the 3D object itself up, down, left, and/or right after insertion, as can be appreciated.

Figure 6:
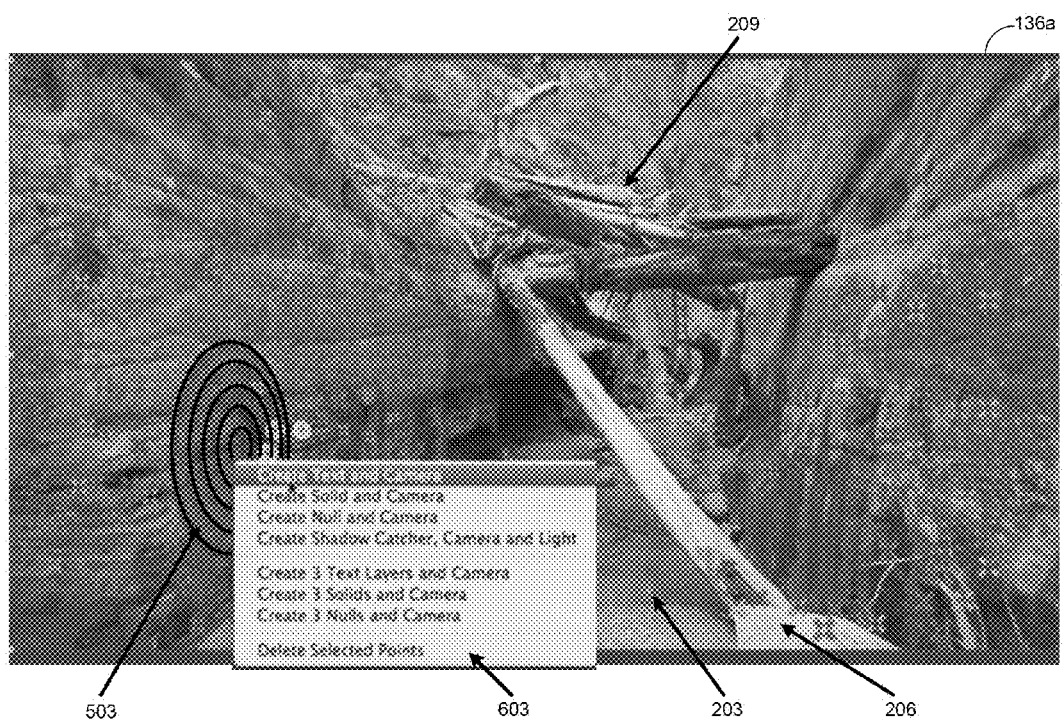

FIG. 6 shows one example of a user interface 139 according to certain embodiments of the present disclosure that is rendered on the display 116. In this example, the user interface 139 depicts the start frame 136a of the video clip (FIG. 1) with the extracted 3D track points 133 (FIG. 1) rendered. Shown are the hiking trail 203, the fallen tree trunk 206, the second tree trunk 209, the target 503, and an insert menu 603.

As shown in FIG. 6, the tracking application 123 has shifted the target 503 left within the defined plane in response to a user request. In one embodiment, the user may desire to insert a 3D object at the target 503 by clicking on the target 503, striking a hot key on the keyboard, selecting a menu option rendered on the display 116, and/or otherwise manipulating the target 503. In response, the tracking application 123 may render an insert menu 603 from which the user may select to insert a 3D object. For instance, the insert menu 603 allows the user to select creating a text layer, a solid layer, a null layer, and/or a shadow catcher. A description of creating the layers are described with respect to FIGS. 7-9.

Additionally, the insert menu 603 allows the user to simultaneously create multiple text layers, multiple solid layers, and multiple null layers. For instance, the user may be presented with an option to create a specific number of each of the layers where the specific number corresponds to the number of 3D track points 133 (FIG. 1) used to define the target 503. In this example, three 3D track points 133 define the target 503. As such, the insert menu 603 includes an option for the user to select to simultaneously create three text layers, three solid layers, or three null layers.

The insert menu 603 may also include an option to delete the selected 3D track points 133. In response to the user selecting the delete option, the tracking application 123 deletes the selected 3D track points 133 from the start frame 136a and all remaining frames 136 of the video 126 (FIG. 1). For instance, the tracking application 123 deletes the three 3D track points 133 that define the target 503 from the start frame 136a and the remaining frames 136 where the selected 3D track points 133 would have been visible. Once deleted, the 3D track points 133 may be recovered by executing the "track camera" function again to re-extract all of the 3D track points 133 from the 2D source points of the video 126, as described above.

Figure 7:
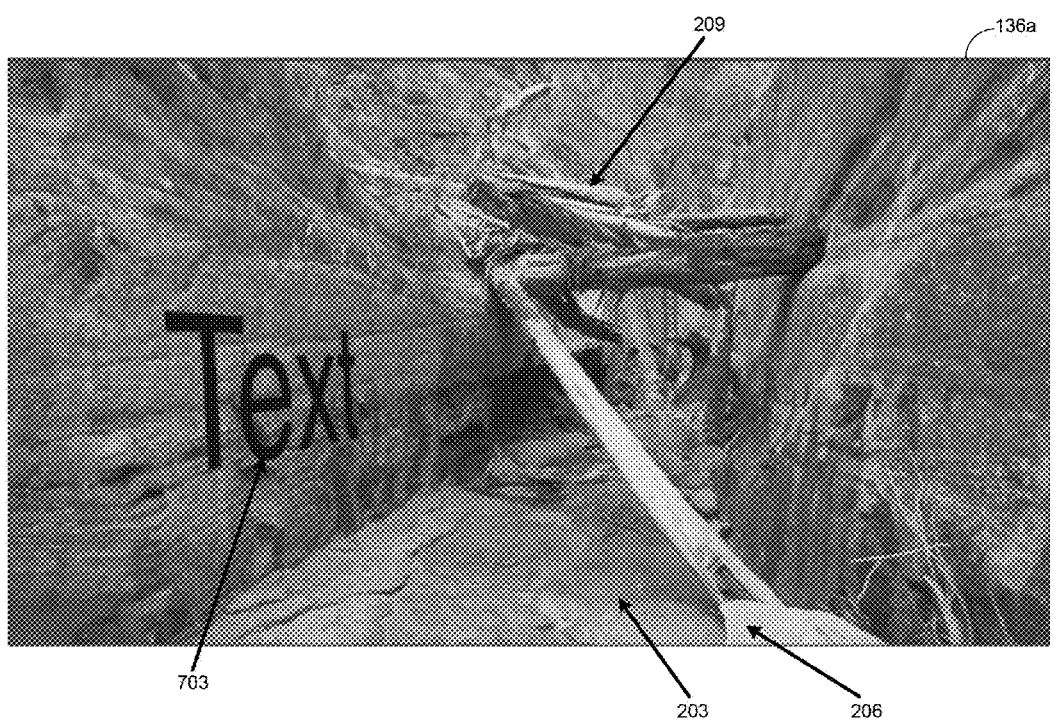

FIG. 7 shows one example of a user interface 139 according to certain embodiments of the present disclosure that is rendered on the display 116. In this example, the user interface 139 depicts the start frame 136a of the video 126 (FIG. 1) with the a 3D text layer 703 inserted into the start frame 136a. Additionally, shown are the hiking trail 203, the fallen tree trunk 206, and the second tree trunk 209. The 3D text layer 703 is inserted into the start frame 136a at a location specified by the target 503 (FIG. 5). Additionally, the 3D text layer 703 remains visible throughout the video 126 unless the angle and/or position of the camera capturing the footage is altered or an object within the video 126 occludes the 3D text layer 703. For instance, a moving object such as an animal may appear on the hiking trail 203 thereby obstructing the 3D text layer 703. In this example, the portion of the 3D text layer 703 appearing behind the moving object will not be visible while the moving object is obstructing the 3D text layer 703.

In one embodiment, the text included in the 3D text layer 703 may be formatted with a desired font, size, justification, style, color, and/or any other type of formatting. Additionally, the opacity of the text included in the 3D text layer 703 may be adjusted. Further, the 3D text layer 703 may be resized and may be moved along either the x-, y-, or z-axes, as described above.

Figure 8:
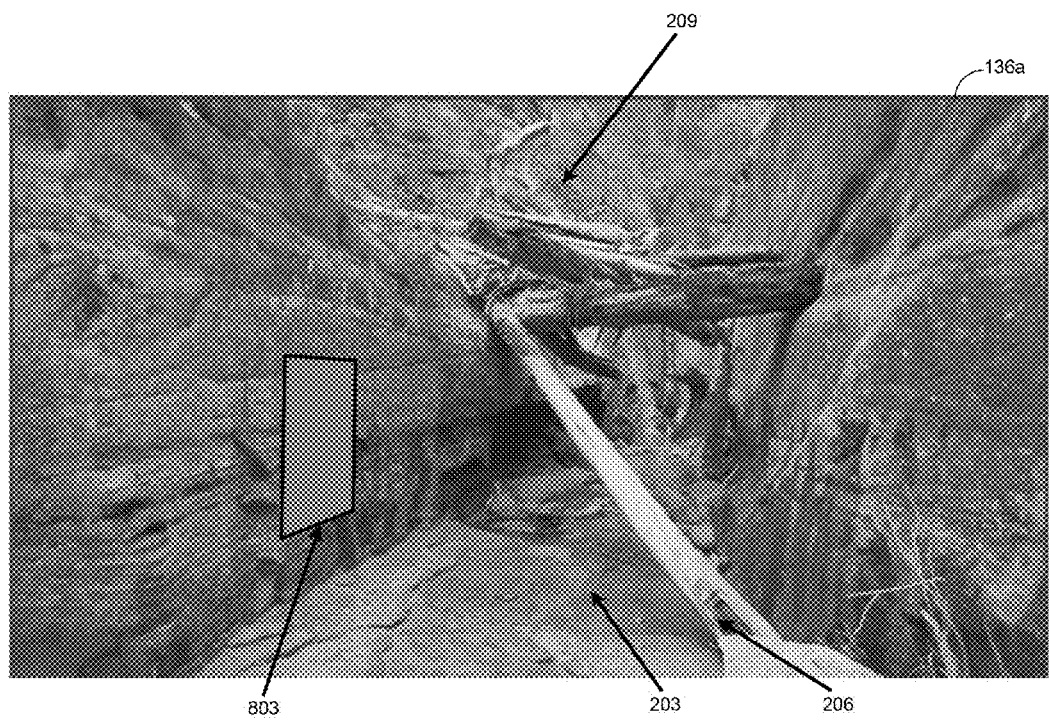

FIG. 8 shows one example of a user interface 139 according to certain embodiments of the present disclosure that is rendered on the display 116. In this example, the user interface 139 depicts the start frame 136a of the video 126 (FIG. 1) with the a 3D solid layer 803 inserted into the start frame 136a. Additionally, shown are the hiking trail 203, the fallen tree trunk 206, and the second tree trunk 209. The 3D solid layer 803 is inserted into the start frame 136a at a location specified by the target 503 (FIG. 5). The 3D solid layer 803 remains visible throughout the video 126 unless the angle and/or position of the camera capturing the footage is altered or an object within the video 126 occludes the 3D solid layer 803. For instance, a moving object such as an animal may appear on the hiking trail 203 thereby obstructing the 3D solid layer 803. In this example, the portion of the 3D solid layer 803 appearing behind the moving object will not be visible while the moving object is obstructing the 3D solid layer 803.

In one embodiment, the 3D solid layer 803 may include an image 129 (FIG. 1) and/or another object. For example, the user may size and position the 3D solid layer 803 at a desired location and then request that an image 129 (FIG. 1) stored in a file system of the computing device 103 be inserted into the 3D solid layer 803. In response, the tracking application 123 may insert the requested image 129 in the 3D solid layer 803. The user may then re-size and move the image 129 within the defined plane of the frame 136, as discussed above. Inserting a 3D null layer operates similarly to insertion of the 3D solid layer. However, the 3D null layer is not visible once inserted. A set of controls for the 3D null layer similar to that of the 3D solid layer allow the user to visualize and indicate the placement of the 3D null layer. The user may place an image 129 in the 3D null layer as described above with respect to the 3D solid layer 803. Additionally, the 3D null layer may be used to pair one or more 3D objects together. For example, multiple visible 3D objects may be coupled to a 3D null layer. In one embodiment, all of the visible 3D objects coupled with the 3D null layer may be placed, sized, and transformed by adjusting the 3D null layer, as described above.

Figure 9:
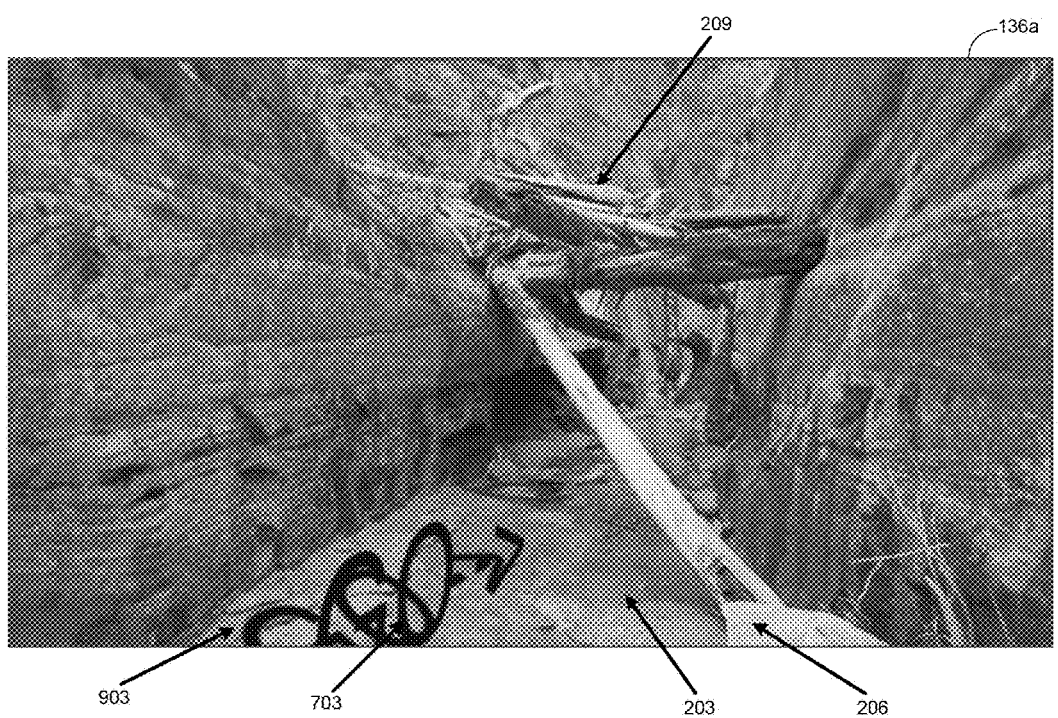

FIG. 9 shows one example of a user interface 139 according to certain embodiments of the present disclosure that is rendered on the display 116. In this example, the user interface 139 depicts the start frame 136a of the video 126 (FIG. 1) with the a 3D shadow catcher layer 903 inserted into the start frame 136a. Additionally, shown are the hiking trail 203, the fallen tree trunk 206, and the second tree trunk 209. In one embodiment, a shadow catcher layer catches a shadow of a 3D object that has been previously inserted into a frame 136 of the video 126. For example, the shadow catcher layer may catch a shadow of text cast by a 3D text layer 703 or an image file inserted into a 3D solid layer 803 (FIG. 1) and/or a 3D null layer.

In this example, the 3D shadow catcher layer 903 is inserted into the start frame 136a at a location specified by the target 503 (FIG. 5). Here, the 3D shadow catcher layer 903 catches a shadow of a previously inserted 3D text layer 703. As shown, the 3D text layer 703 may have been shifted relative to the position as it appears in FIG. 5. In one embodiment, a "light" source associated with the 3D shadow catcher layer 903 may be positioned to cast a shadow on the 3D text layer 703. The light source may be adjusted to orient the shadow to a desired configuration. For example, the angle of the light source may be adjusted to cast a longer and/or a shorter shadow. Additionally, the luminosity of the light source may be adjusted to cast a darker or lighter shadow. Further, the 3D shadow catcher layer 903 and the 3D text layer 703 may be resized or moved within the defined plane, as described above.

Figure 10:
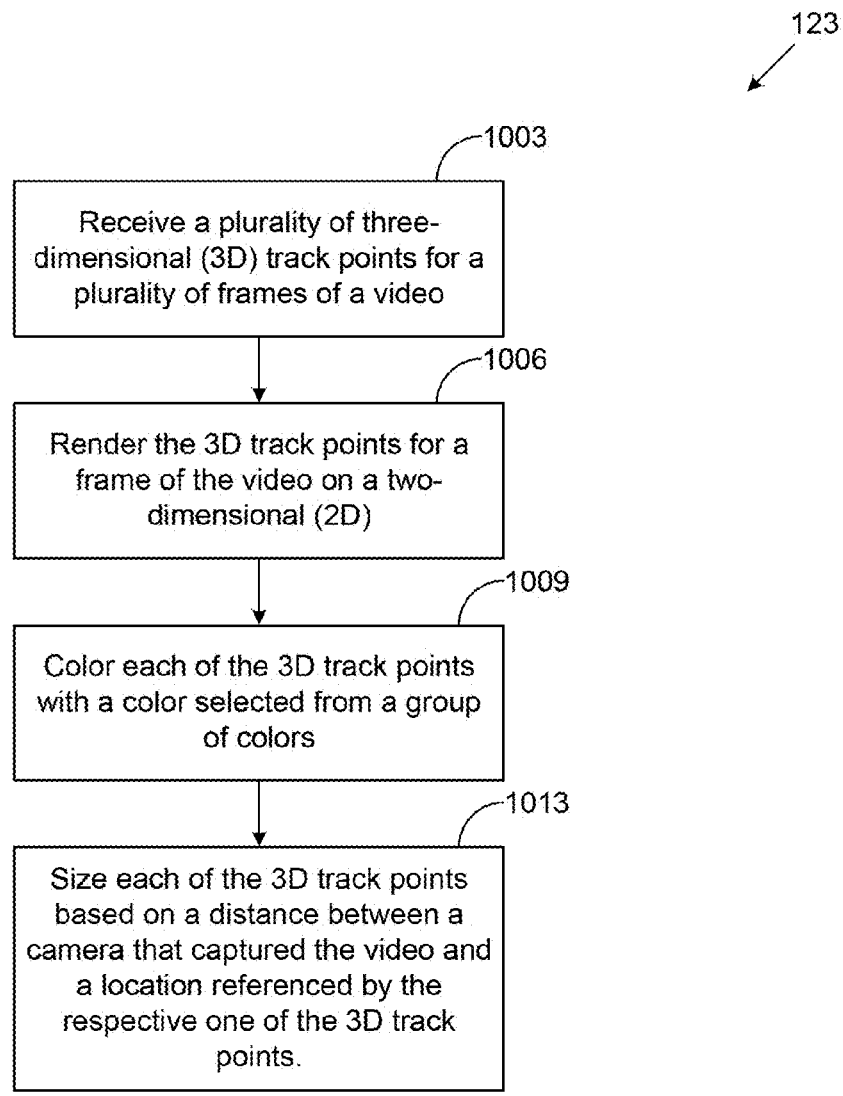
FIG. 10 is a flow chart illustrating an exemplary method for rendering three-dimensional track points that increases temporal coherence.

FIG. 10 is a flowchart that provides one example of the operation of a portion of the tracking application 123 according to certain embodiments. It is understood that the flowchart of FIG. 10 provides merely an example of the many different types of functional arrangements that may be employed to implement the operation of the portion of the tracking application 123 as described herein. As an alternative, the flowchart of FIG. 10 may be viewed as depicting an example of steps of a method implemented in the computing device 103 (FIG. 1) according to one or more embodiments.

Beginning with step 1003, the tracking application 123 receives a plurality of three-dimensional (3D) track points 133 (FIG. 1) for a plurality of frames 136 (FIG. 1) of a video 126 (FIG. 1). Alternatively, the tracking application 123 may extract the 3D track points 133 from the video 126 using an extraction algorithm known in the art. For example, the tracking application 123 identifies the two-dimensional (2D) source locations and solves for the 3D track points 133, as discussed above.

Then, in step 1006, the tracking application 123 renders the 3D track points 133 for a frame 136 of the video 126 on a 2D display 116 (FIG. 1). In one embodiment, the 3D track points 133 may be represented by a distinct character, such as an 'x,' and/or another marking. Additionally, the 3D track points 133 may be rendered within a proximity to the original 2D source points, as discussed above.

In step 1009, the tracking application 123 colors each of the 3D track points 133 with a color selected from a group of colors. In one embodiment, the tracking application 123 employs such a color scheme to increase the temporal coherence of each 3D track point 133 rendered on the display 116. For example, each 3D track point 133 may have a unique and distinguishable color compared to the 3D track points 133 located within a surrounding area of the respective 3D track point 133. In one embodiment, the tracking application 123 colors the 3D track points 133 simultaneously with the rendering of step 1006.

In step 1013, the tracking application 123 sizes each of the 3D track points 133 based on a distance between a camera that captured the video 126 and a location referenced by the respective one of the 3D track points 133. In one embodiment, the tracking application 123 sizes the 3D track points 133 farther away from the camera position to be smaller than the 3D track points 133 closer to the camera position. Similarly, the tracking application 123 sizes the 3D track points 133 closer to the camera position to be larger than the 3D track points 133 farther away from the camera position. Accordingly, the user viewing the 3D track points 133 may associate the size of the 3D track point 133 with a depth of the location of the 2D source point within the video 126. In one embodiment, the tracking application 123 sizes the 3D track points 133 simultaneously with the rendering of step 1006.

Figure 11:
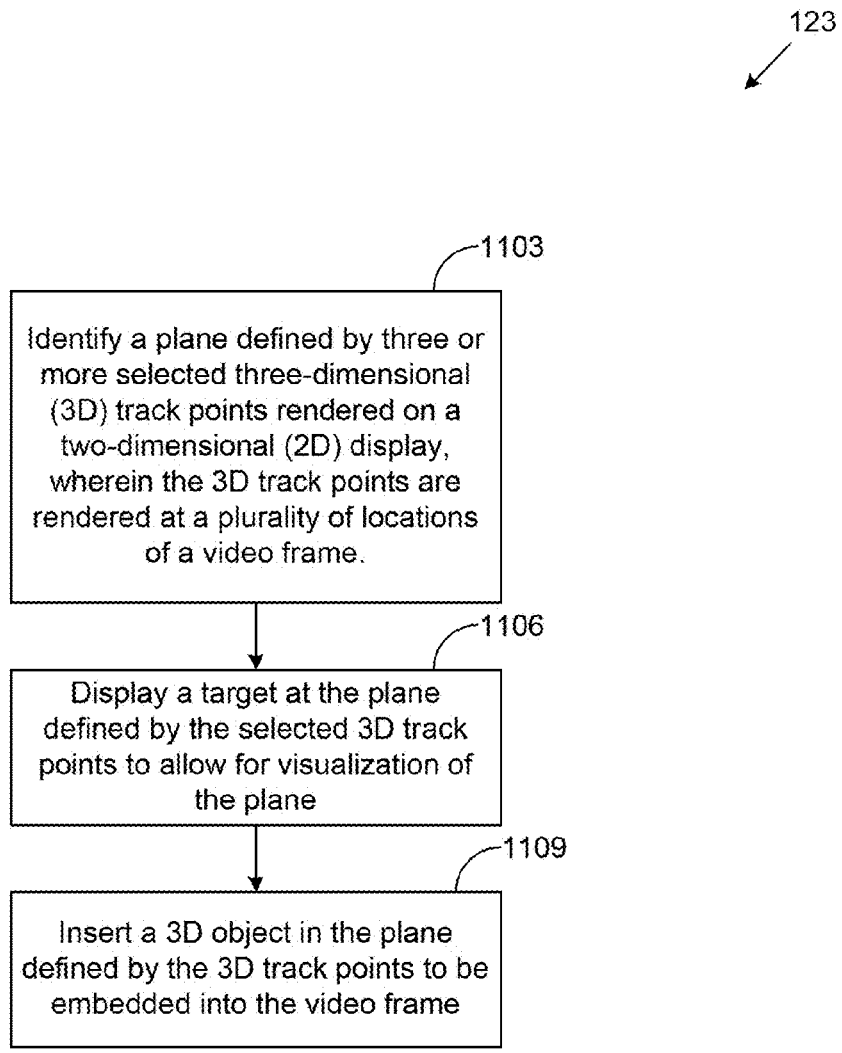
FIG. 11 is a flow chart illustrating an exemplary method for inserting three-dimensional objects into a video composition in a plane defined by a subset of the three-dimensional track points.

FIG. 11 is a flowchart that provides one example of the operation of a portion of the tracking application 123 according to certain embodiments. It is understood that the flowchart of FIG. 11 provides merely an example of the many different types of functional arrangements that may be employed to implement the operation of the portion of the tracking application 123 as described herein. As an alternative, the flowchart of FIG. 11 may be viewed as depicting an example of steps of a method implemented in the computing device 103 (FIG. 1) according to one or more embodiments.

Beginning with step 1103, the tracking application 123 identifies a plane defined by a selected number of 3D track points 133 (FIG. 1) rendered on the 2D display 116 (FIG. 1). In one embodiment, the tracking application 123 may automatically select at least three 3D track points 133 when a mouse and/or a cursor hovers an area of a video frame 136 that includes a group of 3D track points 133. For example, the tracking application 123 may automatically select the three 3D track points 133 that are closest to the mouse. Alternatively, the user may select three or more of 3D track points 133. Responsive to the selection of the 3D track points 133, the tracking application 123 identifies a plane defined by the selected 3D track points 133. For example, the identified plane may include all of the selected 3D track points 133.

In step 1106, the tracking application 123 displays a target at the plane defined by the selected 3D track points 133 to allow for visualization of the plane. For example, the target may a number of concentric circles having a focal point at the center of the plane. In one embodiment, the target may be rendered at an angle and/or with a tilt based on the location of the 3D track points 133 within the frame 136.

Then, in step 1109, the tracking application 123 inserts a 3D object in the plane defined by the selected 3D track points 133 to be embedded into the frame 136. In one embodiment, the 3D object embedded in the frame 136 may be a text layer, a solid layer, a null layer, a shadow catcher, and/or another 3D object. Each of the 3D objects embedded in the frame 136 assumes the orientation, angle, tilt and position of the plane defined by the selected 3D track points 133. In one embodiment, text may be inserted into the text layer and an image and/or other object may be inserted in the solid layer and the null layer. Additionally, a shadow catcher may catch a shadow of a previously inserted 3D object, as described above. For example, a light source associated with the shadow catcher may be adjusted to cast a shadow of the 3D object at a desired angle, intensity, and/or color.

Figure 12:
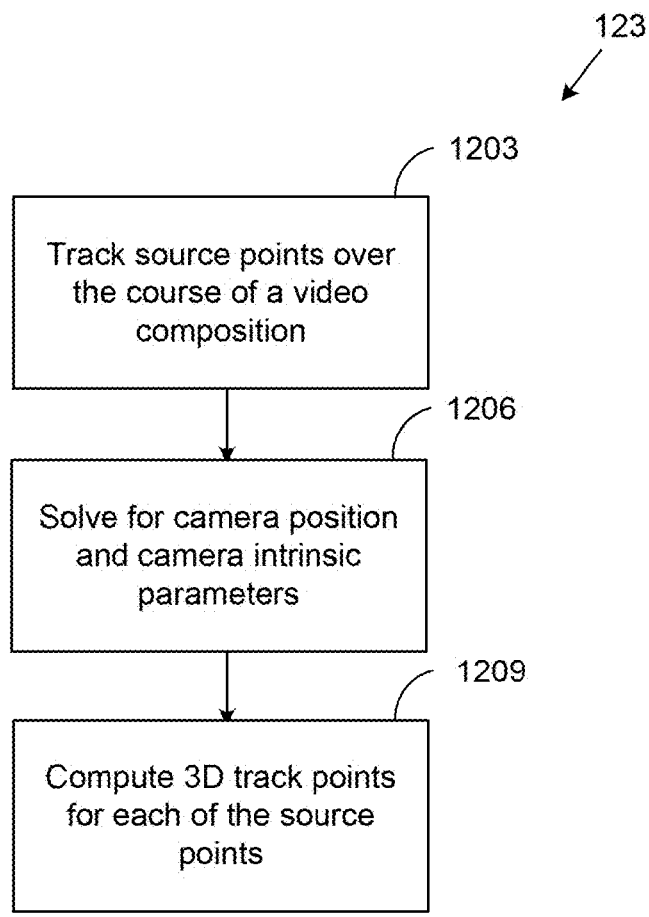
FIG. 12 is a flow chart illustrating an exemplary method for extracting 3D tracking points from a video composition.

FIG. 12 is a flowchart that provides one example of the operation of a portion of the tracking application 123 according to certain embodiments. It is understood that the flowchart of FIG. 12 provides merely an example of the many different types of functional arrangements that may be employed to implement the operation of the portion of the tracking application 123 as described herein. As an alternative, the flowchart of FIG. 12 may be viewed as depicting an example of steps of a method implemented in the computing device 103 (FIG. 1) according to one or more embodiments.

Beginning with step 1203, the tracking application 123 obtains point trajectories for the video 126. In one embodiment, the points may correspond to features that appear in one or more frames of the video 126. The tracking application 123 may employ a tracking approach, such as the Lucas-Kanade-Tomasi approach for identifying quality points (i.e., features) and tracking the points throughout the course of the video 126.

Then, in step 1206, the tracking application 123 solves for a camera position and camera intrinsic parameters of the camera that recorded the video 126. In one embodiment, the tracking application 123 may employ the 3D reconstruction technique described above. For example, the tracking application 123 may employ one or more of the regular 3D reconstruction technique, the rotation-based 3D reconstruction technique, the plane-based 3D reconstruction technique, and/or another 3D reconstruction technique. The tracking application 123 may select one of the 3D reconstruction techniques based on the characteristics of the frames of the video 126, as described above.

In step 1209, the tracking application 123 computes the 3D track points 133 that correspond to the source points. In one embodiment, the tracking application 123 computes the 3D track points 133 based at least in part on the tracked source points, the camera position, and the camera intrinsic parameters. For example, the 3D track points 133 may be triangulated based on the estimated camera motion parameters and camera intrinsic parameters.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

Therefore, the following is claimed:

1. A computer-implemented method comprising:
receiving a first three-dimensional (3D) track point and a second three-dimensional (3D) track point for a frame of a video, wherein the first 3D track point and the second 3D track point are located within a threshold distance of each other;
determining, by a processor, a first color to render the first 3D track point and a second color to render the second 3D track point, the first and second colors visually distinguishing the first and second 3D track point from each other; and
determining, by the processor, a first size to render the first 3D track point and a second size to render the second 3D track point, wherein the first size is determined based on a first distance between a camera that captured the video and a location referenced by the first 3D track point, wherein the second size is determined based on a second distance between the camera and a location referenced by the second 3D track point, and wherein the first distance differs from the second distance;
rendering, by the processor, the first and second 3D track points according to the first and second colors and the first and second sizes for the frame of the video on a two-dimensional (2D) display; and
receiving input specifying an insertion location among the rendered 3D track points for insertion of a 3D object into the video.

2. The computer-implemented method of claim 1, wherein a video object occludes a the first 3D track point or the second 3D track point for a period of time during playback.

3. The computer-implemented method of claim 1, wherein the second 3D track point is located farther away from the camera than the first 3D track point, and the second 3D track point is smaller than the first 3D track point.

4. The computer-implemented method of claim 1, wherein the frame is one of a plurality of frames of the video, and the first 3D track point or the second 3D track point exists only during a subset of the frames comprising the video.

5. The computer-implemented method of claim 4, wherein the 3D track point that corresponds to each video frame are rendered on the 2D display simultaneously with the respective video frame during playback.

6. The computer-implemented method of claim 1, wherein the frame is one of a plurality of frames of the video; and
   receiving the first 3D track point and the second 3D track point comprises extracting the first 3D track point and the second 3D track point from within the frames of the video.

7. The computer-implemented method of claim 6, wherein the extracting further comprises:
   determining tracking regions within the video where a contrast of the video exceeds a threshold contrast to generate a plurality of 2D source points from the video;
   solving for 3D scene data from the 2D source points; and
   correlating the 3D scene data with the 2D source points to extract the first 3D track point and the second 3D track point.

8. The computer-implemented method of claim 7, wherein the 3D scene data is represented by a plurality of position values of stationary objects in the video.

9. The computer-implemented method of claim 7, wherein the 3D scene data is represented by a location of the camera, an orientation of the camera when capturing the video, and a viewing angle of the camera over a span of the video.

10. The computer-implemented method of claim 1, wherein the color of the first 3D track point and the color of the second 3D track point are selected at random.

11. The computer-implemented method of claim 1, wherein the colors are selected to increase temporal coherence of the 3D track points.

12. A non-transitory computer-readable medium embodying a program executable in at least one computing device, the program comprising code that:
   receives a first three-dimensional (3D) track point and a second three-dimensional (3D track point) for a frame of a video, wherein the first 3D track point and the second 3D track point are located within a threshold distance of each other;
   determines, by a processor, a first color to render the first 3D track point and a second color to render the second 3D track point, the first and second colors visually distinguishing the first and second 3D track point from each other; and
   determines, by the processor, a first size to render first 3D track point and a second size to render the second 3D track point, wherein the first size is determined based on a first distance between a camera that captured the video and a location referenced by the first 3D track point, wherein the second size is determined based on a second distance between the camera and a location referenced by the second 3D track point, and wherein the first distance differs from the second distance;
   renders, by the processor, the first and second 3D track points according to the first and second colors and the first and second sizes for the frame of the video on a two-dimensional (2D) display; and
   receives input specifying an insertion location among the rendered 3D track points for insertion of a 3D object into the video.

13. The non-transitory computer-readable medium of claim 12, wherein the frame is one of a plurality of frames of the video, and the color of the first 3D track point or the color of the second 3D track point is consistent across the frames of the video.

14. The non-transitory computer-readable medium of claim 12, wherein the frame is one of a plurality of frames of the video; and
   receiving the first 3D track point and the second 3D track point comprises extracting the first 3D track point and the second 3D track point from within the frames of the video.

15. The non-transitory computer-readable medium of claim 14, wherein the extracting further comprises:
   determining tracking regions within the video where a contrast of the video exceeds a threshold contrast to generate a plurality of 2D source points from the video;
   solving for 3D scene data from the 2D source points; and
   correlating the 3D scene data with the 2D source points to extract the first 3D track point and the second 3D track point.

16. A system, comprising:
   a processor; and
   a non-transitory computer-readable medium on one or more devices comprising instructions that, when executed by the processor, perform steps comprising:
   receiving a first three-dimensional (3D) track point and a second three-dimensional (3D) track point for a frame of a video, wherein the first 3D track point and the second 3D track point are located within a threshold distance of each other;
   determining a first color to render the first 3D track point and a second color to render the second 3D track point, the first and second colors visually distinguishing first and second 3D track point from each other; and
   determining a first size to render the first 3D track point and a second size to render the second 3D track point, wherein the first size is determined based on a first distance between a camera that captured the video and a location referenced by the first 3D track point, wherein the second size is determined based on a second distance between the camera and a location referenced by the second 3D track point, and wherein the first distance differs from the second distance;
   rendering the plurality of first and second 3D track points according to the first and second colors and the first and second sizes for the frame of the video on a two-dimensional (2D) display; and
   receiving input specifying an insertion location among the rendered 3D track points for insertion of a 3D object into the video.

17. The system of claim 16, wherein the frame is one of a plurality of frames of the video, and the color of the first 3D track point and the second 3D track point is consistent across the frames of the video.

18. The system of claim 16, wherein the frame is one of a plurality of frames of the video; and
   receiving the first 3D track point and the second 3D track points comprises extracting the 3D track points from within the frames of the video.

19. The system of claim 18, wherein the extracting further comprises:
   determining tracking regions within the video where a contrast of the video exceeds a threshold contrast to generate a plurality of 2D source points from the video;
   solving for 3D scene data from the 2D source points; and
   correlating the 3D scene data with the 2D source points to extract the first 3D track point and the second 3D track point.

20. The system of claim 16, wherein the colors for the first 3D track point and the second 3D track point are selected from a group of unique colors.

* * * * *